United States Patent
Allen et al.

(10) Patent No.: US 9,021,503 B2
(45) Date of Patent: Apr. 28, 2015

(54) COORDINATING APPLICATION STATE AND COMMUNICATION MEDIUM STATE

(75) Inventors: Nicholas A. Allen, Redmond, WA (US); Stefan Batres, Sammamish, WA (US); Jean-Emile Elien, Bellevue, WA (US); John A. Taylor, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1126 days.

(21) Appl. No.: 12/019,041

(22) Filed: Jan. 24, 2008

(65) Prior Publication Data

US 2009/0133037 A1   May 21, 2009

Related U.S. Application Data

(60) Provisional application No. 60/988,736, filed on Nov. 16, 2007.

(51) Int. Cl.
G06F 9/46 (2006.01)
G06F 7/00 (2006.01)
G06F 9/52 (2006.01)
G06F 9/54 (2006.01)

(52) U.S. Cl.
CPC ............... *G06F 9/526* (2013.01); *G06F 9/546* (2013.01)

(58) Field of Classification Search
None
See application file for complete search history.

(56) References Cited

U.S. PATENT DOCUMENTS

| | | | |
|---|---|---|---|
| 5,339,392 A | 8/1994 | Risberg | |
| 5,371,889 A | 12/1994 | Klein | |
| 5,452,445 A | 9/1995 | Hallmark et al. | |
| 5,465,328 A * | 11/1995 | Dievendorff et al. | ........... 714/15 |
| 5,592,622 A | 1/1997 | Isfeld | |
| 5,802,310 A | 9/1998 | Rajaraman | |
| 5,913,213 A | 6/1999 | Wikstrom | |
| 5,924,097 A | 7/1999 | Hill et al. | |
| 5,974,442 A | 10/1999 | Adams | |
| 6,185,197 B1 | 2/2001 | Cheung | |

(Continued)

FOREIGN PATENT DOCUMENTS

| | | |
|---|---|---|
| CN | 101495966 A | 7/2009 |
| CN | 101547430 A | 9/2009 |

(Continued)

OTHER PUBLICATIONS

U.S. Appl. No. 12/018,401, filed Jan. 23, 2008, Nicholas A. Allen.

(Continued)

*Primary Examiner* — Charles E Anya
(74) *Attorney, Agent, or Firm* — Kate Drakos; Rahu Chinagudabha; Micky Minhas

(57) ABSTRACT

The present invention extends to methods, systems, and computer program products for coordinating application sate and communication mediums state. Embodiments of present invention provide a mechanism for a communication medium to provide a view of message content for a message (a peek) to an application along with the communication medium preventing further access to the message (a lock) until the application signals back how to handle the message. Thus, the communication medium indicates that the message is locked for the duration of processing at the application. Indicating that the message is locked significantly reduces the chance of the message being provided to another application (or another consumer of the same application) during the time the application is processing the view of message content.

8 Claims, 4 Drawing Sheets

(56) References Cited

U.S. PATENT DOCUMENTS

| | | | |
|---|---|---|---|
| 6,263,360 B1* | 7/2001 | Arnold et al. | 709/203 |
| 6,332,150 B1 | 12/2001 | Khan et al. | |
| 6,353,834 B1* | 3/2002 | Wong et al. | 714/15 |
| 6,425,017 B1 | 7/2002 | Dievendorff et al. | |
| 6,463,480 B2 | 10/2002 | Kikuchi | |
| 6,484,196 B1 | 11/2002 | Maurille | |
| 6,609,178 B1* | 8/2003 | Ofer | 711/152 |
| 6,687,735 B1 | 2/2004 | Logston et al. | |
| 6,732,153 B1 | 5/2004 | Jakobson et al. | |
| 6,748,583 B2 | 6/2004 | Aizenbud-Reshef et al. | |
| 6,817,018 B1 | 11/2004 | Clarke et al. | |
| 6,845,230 B2 | 1/2005 | Syed | |
| 6,848,108 B1 | 1/2005 | Caron | |
| 6,848,109 B1 | 1/2005 | Kühn | |
| 6,853,617 B2 | 2/2005 | Watson et al. | |
| 6,886,041 B2 | 4/2005 | Messinger | |
| 6,886,169 B2 | 4/2005 | Wei | |
| 6,968,395 B1 | 11/2005 | Lee | |
| 6,971,001 B1 | 11/2005 | Rolfs | |
| 6,983,322 B1 | 1/2006 | Tripp et al. | |
| 7,068,634 B2 | 6/2006 | Vanttinen | |
| 7,111,001 B2 | 9/2006 | Harris | |
| 7,149,976 B2 | 12/2006 | Yagati | |
| 7,154,901 B2 | 12/2006 | Chava et al. | |
| 7,200,676 B2 | 4/2007 | Christensen et al. | |
| 7,240,350 B1* | 7/2007 | Eberhard et al. | 719/314 |
| 7,318,109 B2 | 1/2008 | Liscano et al. | |
| 7,330,860 B2 | 2/2008 | Adiba | |
| 7,370,329 B2* | 5/2008 | Kumar et al. | 718/107 |
| 7,380,135 B2 | 5/2008 | Nishimoto et al. | |
| 7,392,057 B2 | 6/2008 | Lee | |
| 7,401,334 B2* | 7/2008 | Fussell | 718/104 |
| 7,409,428 B1 | 8/2008 | Brabec | |
| 7,434,225 B2 | 10/2008 | Groetzner et al. | |
| 7,527,558 B2 | 5/2009 | Lavoie | |
| 7,543,181 B2 | 6/2009 | Buxton | |
| 7,565,451 B2 | 7/2009 | Cabrera | |
| 7,631,108 B2 | 12/2009 | Kesselman | |
| 7,640,249 B2 | 12/2009 | Smits | |
| 7,711,788 B2 | 5/2010 | Lev Ran et al. | |
| 7,743,109 B2 | 6/2010 | Kaminsky et al. | |
| 7,783,610 B2 | 8/2010 | Lin et al. | |
| 7,802,263 B2 | 9/2010 | Fuchs | |
| 7,827,135 B2* | 11/2010 | Leff et al. | 707/610 |
| 7,865,684 B2* | 1/2011 | Michaylov et al. | 711/168 |
| 7,870,295 B2 | 1/2011 | Johnson | |
| 7,937,364 B1* | 5/2011 | Chandrasekaran et al. | 707/636 |
| 7,945,631 B2 | 5/2011 | Chkodrov et al. | |
| 8,006,248 B2* | 8/2011 | Garza et al. | 719/313 |
| 8,032,890 B2* | 10/2011 | Brendle et al. | 718/104 |
| 8,095,935 B2 | 1/2012 | Paramasivam et al. | |
| 8,117,153 B2* | 2/2012 | Cattell et al. | 707/610 |
| 8,301,706 B2 | 10/2012 | Paramasivam | |
| 8,438,238 B2* | 5/2013 | Moser et al. | 709/217 |
| 2001/0023482 A1 | 9/2001 | Wray | |
| 2002/0087548 A1 | 7/2002 | Tasalloti | |
| 2002/0116538 A1 | 8/2002 | Chen | |
| 2004/0162901 A1 | 8/2004 | Mangipudi et al. | |
| 2004/0186918 A1 | 9/2004 | Lonnfors | |
| 2004/0268357 A1 | 12/2004 | Joy et al. | |
| 2005/0147057 A1 | 7/2005 | LaDue | |
| 2005/0195820 A1 | 9/2005 | Betts | |
| 2005/0216917 A1 | 9/2005 | Krishnaswamy et al. | |
| 2005/0278270 A1 | 12/2005 | Carr | |
| 2006/0053163 A1 | 3/2006 | Liu et al. | |
| 2006/0080579 A1 | 4/2006 | Rothman et al. | |
| 2006/0085797 A1 | 4/2006 | Connelly | |
| 2006/0101064 A1* | 5/2006 | Strong et al. | 707/102 |
| 2006/0136367 A1* | 6/2006 | Todd | 707/2 |
| 2006/0146879 A1 | 7/2006 | Anthias et al. | |
| 2006/0149865 A1* | 7/2006 | Kirstein | 710/52 |
| 2006/0155862 A1 | 7/2006 | Kathi et al. | |
| 2006/0187902 A1 | 8/2006 | Birch et al. | |
| 2006/0230062 A1 | 10/2006 | Roy-Chowdhury et al. | |
| 2007/0005613 A1 | 1/2007 | Singh et al. | |
| 2007/0005640 A1* | 1/2007 | Klein et al. | 707/103 R |
| 2007/0027928 A1 | 2/2007 | Majumdar | |
| 2007/0109592 A1 | 5/2007 | Parvathaneni et al. | |
| 2008/0086567 A1 | 4/2008 | Langen et al. | |
| 2008/0187004 A1 | 8/2008 | Johnson | |
| 2008/0288954 A1 | 11/2008 | Fuchs | |
| 2009/0132671 A1 | 5/2009 | Chkodrov et al. | |
| 2009/0133037 A1 | 5/2009 | Allen | |
| 2009/0199208 A1 | 8/2009 | Pinto | |
| 2009/0216793 A1 | 8/2009 | Szyperski | |
| 2009/0222794 A1 | 9/2009 | Pinto | |
| 2009/0282396 A1 | 11/2009 | Boyer | |
| 2009/0319911 A1 | 12/2009 | McCann et al. | |
| 2009/0320044 A1 | 12/2009 | Dar et al. | |

FOREIGN PATENT DOCUMENTS

| | | |
|---|---|---|
| EP | 1198106 | 4/2002 |
| EP | 1873643 A1 | 1/2008 |
| WO | WO2006118529 A2 | 11/2006 |

OTHER PUBLICATIONS

U.S. Appl. No. 60/988,737, filed Nov. 16, 2007, Nicholas A. Allen.

Aaron Skonnard, Pluralsight, "A Developer's Introduction to Windows Communication Foundation (WCF).NET 4 Beta 1", Jul. 2009, 57 pages.

Office Action dated Jun. 27, 2012 cited in U.S. Appl. No. 12/727,066.

Notice of Allowance dated Jan. 18, 2012 cited in U.S. Appl. No. 12/767,091.

U.S. Appl. No. 13/432,341, filed Mar. 28, 2012, Allen.

Office Action dated Apr. 5, 2012 cited in U.S. Appl. No. 12/018,401.

U.S. Appl. No. 12/767,091, Jun. 25, 2012, Notice of Allowance.

Notice of Allowance mailed Jan. 4, 2013 cited in U.S. Appl. No. 12/727,066.

Office Action dated Sep. 28, 2012 cited in U.S. Appl. No. 12/018,401.

Office Action dated Oct. 17, 2012 cited in U.S. Appl. No. 12/605,236.

Notice of Allowance mailed Nov. 2, 2012 cited in U.S. Appl. No. 12/727,066.

Notice of Allowance dated Dec. 4, 2013 cited in U.S. Appl. No. 12/605,236.

Office Action dated Mar. 28, 2013 cited in U.S. Appl. No. 12/605,236.

Notice of Allowance dated Apr. 10, 2013 cited in U.S. Appl. No. 12/018,401.

Office Action dated Apr. 12, 2013 cited in U.S. Appl. No. 13/655,162.

Notice of Allowance dated May 20, 2013 cited in U.S. Appl. No. 12/727,066.

Notice of Allowance dated Aug. 12, 2013 cited in U.S. Appl. No. 13/655,162.

Office Action dated Oct. 13, 2011 cited in U.S. Appl. No. 12/018,401.

Office Action dated Apr. 7, 2014 cited in U.S. Appl. No. 13/432,341.

U.S. Appl. No. 13/655,162, filed Oct. 18, 2012, Paramasivam.

Load-Balancing for MySQL http://diku.dk/publikationer/tekniske.rapporter/rapporter/03-1.pdf (67 pages) Fall 2003—Dennis haney & Klaus S. Madsen.

Planning for Reliability and High Availability http://msdn.microsoft.com/en-us/library/ms942932.aspx (32 pages) 2008—Microsoft Coorporation. [Retrieved from the internet May 21, 2008].

Distributed Computing with BEA WebLogic Server http://www-db.cs.wisc.edu/cidr/cidr2003/program/p26.pdf (11 pages) Jan. 5-8, 2003—Dean Jacobs—BEA Systems.

On Affinity Based Routing in Multi-System Data Sharing http://www.vldb.org/conf/1986/P249.PDF (8 pages) Aug. 1986—Phillip S. Yu, Douglas W. Cornell, Daniel M. Dias and Balakrishna R Iyler.

U.S. Appl. No. 12/484,741, Jun. 27, 2012, Notice of Allowance.

Ceponiene, Lina, et al., "Transformation from Requirements to Design for Service Oriented Information Systems", ADBIS Research Communications, 2005, pp. 164-177.

Arbab, Farhad, "The Influence of Coordination on Program Structure", 1997 IEEE, pp. 300-309.

Zambonelli, Franco, et al., "Programmable Coordination Infrastructures for Mobility", 2001, 5 pages.

(56) References Cited

OTHER PUBLICATIONS

Arbab, Farhad, et al., "Coordination through Channel Composition", 2002, LNCS 2315, pp. 22-39.
Castro, Eva M., et al., Departamento de Ingenieria de Sistemas Telematicos Universidad Politecnica de Madrid DIT.UPM, "Reliable Multicast for Coordination of Cooperative Applications", http://jungla.dit.upm.es/~ecastro/ReliableMulticast/rmulticast.html, 1999, 1 page.
Guermouche, Abdou, et al., "A study of various load information exchange mechanisms for a distributed application using dynamic scheduling" Jan. 2005, 16 pages.
Albrecht, Jeannie, et al., "Remote Control: Distributed Application Configuration, Management, and Visualization with Plush", 2007, 16 pages.
U.S. Appl. No. 12/767,091, filed Apr. 26, 2010, Allen.
U.S. Appl. No. 12/727,066, filed Mar. 18, 2010, Allen.
Bhatti, Nina T., et al., "A System for Constructing Configurable High-Level Protocols", 1995, 13 pages.
Lee, Whay Sing, et al., "An Efficient, Protected Message Interface", Nov. 1998, pp. 69-75.
Nodine, Marian, et al., "Task Coordination Paradigms for Information Agents", Lecture Notes in Computer Science; vol. 1986, Proceedings of the 7th International Workshop on Intelligent Agents VII. Agent Theories Architectures and Languages, Year of Publication: 2000, 15 pages.
Onion, Fritz, "State Management in ASP.NET", informIT, May 30, 2003, 5 pages.
Allen, Nicholas, "Nicholas Allen's Indigo Blog—Future of Queuing", Windows Communication Foundation from the Inside, Dec. 1, 2008, 2 pages.
Notice of Allowance dated Jul. 23, 2014 cited in U.S. Appl. No. 13/432,341.
First Office Action and Search Report Issued in Chinese Patent Application No. 201180020852.1, Mailed Date: Dec. 3, 2014, 11 Pages.
Notice of Allowance dated Dec. 19, 2014 cited in U.S. Appl. No. 13/432,341.
Varda, Kenton, "Protocol Buffers: Google's Data Interchange Format", Google Open Source Blog, Available at least as early as Jul. 2008, 17 pages. Available at <<http:/ google-opensource.blogspot.com/2008/07/protocol-buffers-googles-data.html>>.
"Protocol Buffers" Available at least as early as Nov. 2008, 2 pages. Available at <<https://web.archive.org/web/20090413034842/http://en.wikipedia.org/wiki/Protocol_buffers>>.
Slee, et al., "Thrift: Scalable Cross-Language Services Implementation", Available at least as early as Apr. 2007, 8 pages. Available at <<https://thrift.apache.org/static/files/thrift-20070401.pdf>>.
"Apache Thrift", Available at least as early as Apr. 2010, 2 pages, Available at <<https://web.archive.org/web/20100502080636/http://en.wikipedia.org/wiki/Apache_Thrift>>.
"Comparison of data serialization formats", Available at least as early as Sep. 2009, 3 pages. Available at <<https://web.archive.org/web/20090928103714/http://en.wikipedia.org/wiki/Comparison_of_data_serialization_formats>>.
Steffen, Andreas, "Abstract Syntax Notation One ASN.1" Available at least as early as Jan. 2002, 25 pages. Available at <<http://www.strongsec.com/zhw/Ksy_ASN1.pdf>>.
"Abstract Syntax Notation 1" Available at least as early as Feb. 2004, 2 pages. Available at <<https://web.archive.org/web/20040315060939/http://en.wikipedia.org/wiki/Abstract_syntax_notation_one>>.
"Abstract Syntax Notation One", Available at least as early as May 2008, 5 pages. Available at <<https://web.archive.org/web/20080612053340/http:/en.wikipedia.org/wiki/Abstract_syntax_notation_one>>.

\* cited by examiner

COORDINATING APPLICATION STATE AND COMMUNICATION MEDIUM STATE

CROSS-REFERENCE TO RELATED APPLICATIONS

This application claims the benefit of U.S. Provisional Application No. 60/988,736, entitled "Coordinating Application State and Communication Medium State", filed on Nov. 16, 2007, which is incorporated herein in its entirety.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing components.

As computerized systems have increased in popularity, so have the complexity of the software and hardware employed within such systems. In general, the need for seemingly more complex software continues to grow, which further tends to be one of the forces that push greater development of hardware. For example, if application programs require too much of a given hardware system, the hardware system can operate inefficiently, or otherwise be unable to process the application program at all. Recent trends in application program development, however, have removed many of these types of hardware constraints at least in part using distributed application programs.

In general, distributed application programs comprise components that are executed over several different hardware components. Distributed application programs are often large, complex, and diverse in their implementations. One can appreciate, that while this ability to combine processing power through several different computer systems can be an advantage, there are various complexities associated with distributing application program modules.

For example, applications can change internal state in accordance with the contents of messages received over a communication medium. In addition to application state change, the communication medium can also change state (e.g., in that it no longer contains the message). Generally, the process of receiving a message involves at least two steps: a) an application accesses message content and b) the state of the communication medium is updated. When these two steps are coupled into a single receive function, coordinating the respective state changes in the application and the communication medium can be difficult.

For example, the delivery of a message alters the state of the communication medium in that the message is no longer present in the communication medium following delivery. The receipt of a message also alters the state of an application determined by the particular custom logic of that application. The custom logic may require access to the contents of the message being delivered. Thus, processing difficulties (e.g., duplicate and inappropriate processing by competing application consumers) can occur when access to the contents of a message is coupled to the state change in the communication medium.

In some environments, the difficulties are partially addressed by allowing the application to execute the receive function on the communication medium and its own internal state change under the same two-phase commit transaction. However, under such circumstance the application is unable to use two-phase commit transactions as part of the process of deciding on its final state. This would happen, for example, if an application was executing multiple processing attempts to arrive at the final state.

BRIEF SUMMARY

The present invention extends to methods, systems, and computer program products for coordinating application state and communication medium state. An application sends a message request to a communication medium. The communication medium receives the message request from application. The communication medium identifies the next available message at the communication medium.

The communication medium provides a view of the contents of the next available message to the application. The communication medium locks the next available message to prevent further access to the contents of the next available message.

The application receives a view of the contents of a message from the communication medium. Receiving the content view indicates that the communication medium has locked the message for exclusive access by the consumer. The application attempts to update application state for the application based on the content view. The application determines the results of the attempted application state update.

The application signals the communication medium how to update communication medium state based on the determined results to coordinate the communication medium state with the application state. The communication medium receives the signal from the application indicating how to update communication medium state. The communication medium updates the communication medium state based on and in response to the signal to coordinate the communication medium state with the application state.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
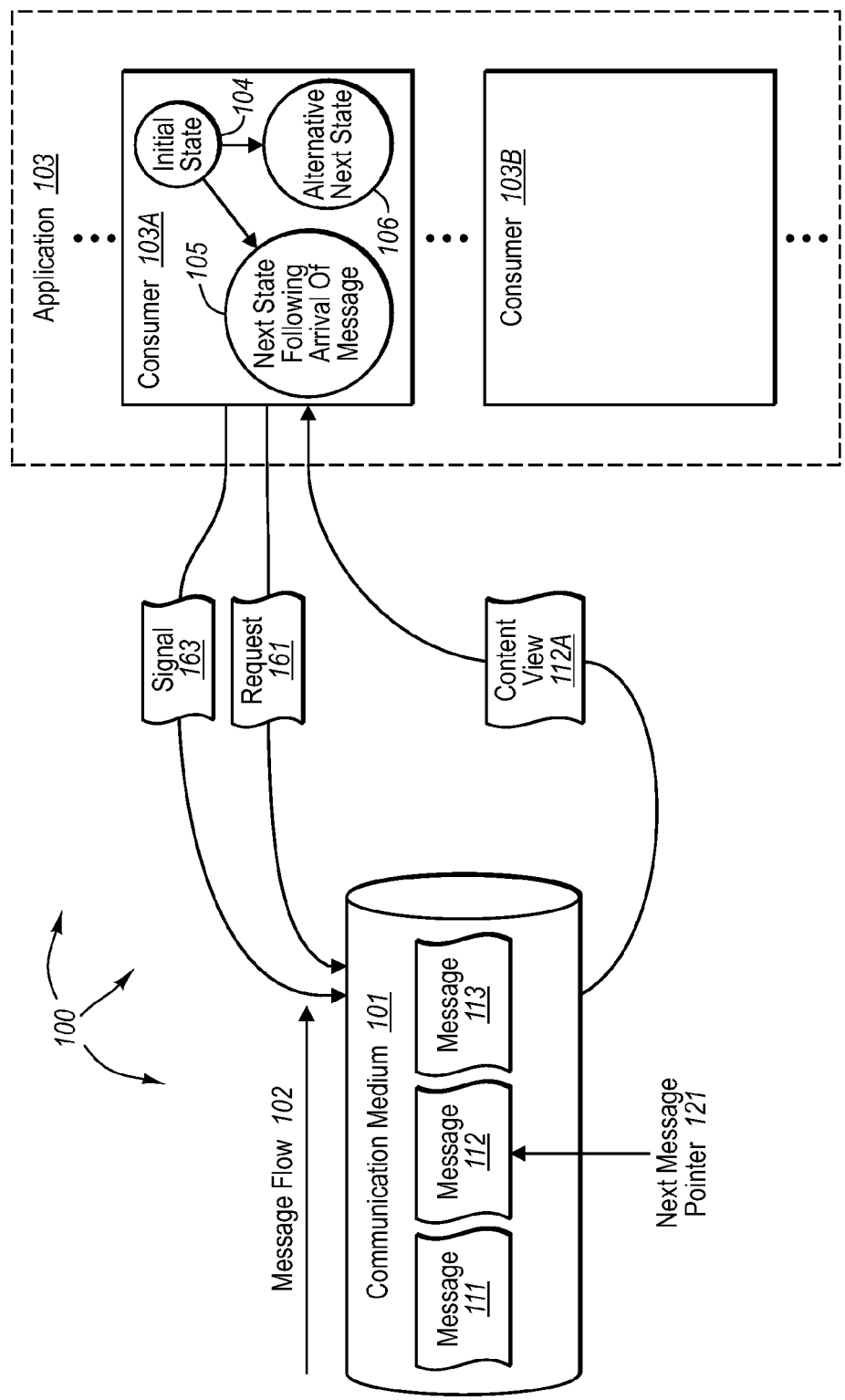
FIG. 1 illustrates an example computer architecture for coordinating application state and communication medium state.

The present invention extends to methods, systems, and computer program products for coordinating application state and communication medium state. An application sends a message request to a communication medium. The communication medium receives the message request from application. The communication medium identifies the next available message at the communication medium.

The communication medium provides a view of the contents of the next available message to the application. The communication medium locks the next available message to prevent further access to the contents of the next available message.

The application receives a view of the contents of a message from the communication medium. Receiving the content view indicates that the communication medium has locked the message for exclusive access by the consumer. The application attempts to update application state for the application based on the content view. The application determines the results of the attempted application state update.

The application signals the communication medium how to update communication medium state based on the determined results to coordinate the communication medium state with the application state. The communication medium receives the signal from the application indicating how to update communication medium state. The communication medium updates the communication medium state based on and in response to the signal to coordinate the communication medium state with the application state.

Accordingly, in some embodiments a message receive function is separated into an access action and a separate lock action. An application executes those actions separately while performing an internal state update between them. The separation permits an application to determine its final state before signaling the completion of the receive operation to the communication medium (e.g., a logical delete of the message from the communication medium).

An application can be distributed into several competing consumers. In a first discrete action, one of the consumers accesses (or "peeks" at) the contents of a message. In a second discrete action, the communication medium locks the message to the accessing consumer for the duration of message receipt. The message access or "peek" can trigger the message lock. Thus, the separation of actions also significantly increases the chance that the application receives the message only once.

The state coordination can be further enhanced by allowing the application to use a two-phase commit transaction around its internal state change and the delete operation. Further embodiments include an application programming interface ("API") for implementing the separate discrete actions. The API can be used to decouple application implementations and different communication mediums.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, it should be understood, that upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 for coordinating application state and communication medium state. Referring to FIG. 1, computer architecture 100 includes communication medium 101, message flow 102, and application 103. Each of the depicted components can be connected to one another over (or be part of) a network, such as, for example, a Local Area Network ("LAN"), a Wide Area Network ("WAN"), and even the Internet. Accordingly, each of the depicted components as well as any other connected components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Communication medium 101 can be virtually any type of medium, such as, for example, a queue system or database, that can provide messages to applications. Thus, communication medium 101 can carry message flow 102. Message flow 102 includes a plurality of messages including messages 111, 112, and 113.

Each of messages 111, 112, and 113 can be an envelope that contains message headers and a message body with message content. For example, a message object can be a SOAP envelope that includes XML instructions in both a message header and message body. Messages can be associated with local message properties. Local message properties can indicate temporary message state not necessarily derived from transfer of the message. In some embodiments, local message properties are associated with messages by being attached to the messages.

The messages of message flow 102 can be sent from some other network connectable system or device for delivery to application 103. Alternately, message flow 102 can be from another application on the same computer system as application 103 or even between different consumers of application 103. That is, one consumer of application 103 can send a message to communication medium 101. Subsequently, another consumer of application 103 can receive the message from communication medium 101.

Application 103 includes a plurality of competing consumers, including consumer 103A and 103B, which compete for messages being received at application 103. For example, consumers 103A, 103B, etc, can be configured to process purchase orders included in message flow 102.

For any number of reasons, such as, for example, scalability, the plurality of consumers (103A, 103B, etc) can be physically distributed across a number of nodes. Each consumer can have a copy of application logic to compete for message delivered from communication medium 101. Thus, there can be several instances of the application logic running concurrently, competing with each other for messages from communication medium 101.

In such an environment, one competing consumer can examine a message at a time. Communication medium 101 can lock a message that is being examined by an application. For example, communication medium 101 can lock message 113 when consumer 103A examines message 113.

When a message is locked, another competing consumer sees the next message in a message flow as the message immediately behind the locked message. Communication medium 101 can maintain a next message pointer to point to the next available message (or message that isn't already being examiner by a consumer) in message flow 102. For example, communication medium 101 can maintain next message pointer 121. Thus, when consumer 103A is examining message 113, next message pointer 121 points to message 112. Accordingly, consumer 103B sees message 112 as the next message.

Accordingly, application 103 (through consumer 103A) is permitted to examine (or "peek" at) message 113 while communication medium 101 maintains a lock on message 113. After a state transition, application 103 can signal communication medium 101 to delete message 113. A delete signal completes the successful receipt of a message. Alternately, consumer 103A can also signal communication medium 101 to release the lock of (i.e., unlock) message 113 if application 103 cannot accept the message 113. An unlock completes an unsuccessful receipt of a message.

In some embodiments, an application receives a message content from a communication medium by executing a receive function. The message content is the object returned by the execution of that receive function. In some embodiments, a receive function gives an application (consumer) a view on a locked copy of message contents. For example, consumer 103A can execute a receive function to have a view of the content of message 113 returned as an object to consumer 103A. In these embodiments, a standard receive function (e.g., one that returns the actual message) can be overloaded to return a view on a locked copy of a message (as opposed to the actual message). The overloading of the receive function facilitates a level of polymorphism within the application code, such as, for example, in a front-end message processing pipeline.

The message object can then be extended with a property associated with the message. The property is an abstraction of a portion of temporary state the communication medium is holding and associating with the message. The consumer interacts with the property to complete message receipt. When a locked view of message contents is provided to a consumer, the property can indicate that the view is locked (e.g., the value can be set to LOCKED). The property can be examined to prevent communication medium 101 from providing a view of the contents of the message to another consumer. When processing of the view of the contents is complete, the consumer can signal either the delete of the message in the communication medium (e.g., set the value of the property to DELETED) or the release of the lock (e.g., set the value of the property to UNLOCKED).

An application program interface can be defined for an adding a message property. Such as for example:

```
public abstract class PeekLockMessageProperty : IMessageProperty
{
  public readonly static string Name = "PeekLock";
  public enum PeekLockState { Locked, Deleted, Unlocked, Faulted }
  public abstract PeekLockState State { get; }
  public abstract IMessageProperty CreateCopy( );
  public abstract void DeleteMessage( );
  public abstract void DeleteMessage(TimeSpan timeout);
  public abstract IAsyncResult BeginDeleteMessage(AsyncCallback
callback, object state);
  public abstract IAsyncResult BeginDeleteMessage(TimeSpan timeout,
AsyncCallback callback, object state);
  public abstract void EndDeleteMessage(IAsyncResult result);
  public abstract void UnlockMessage( );
  public abstract void UnlockMessage(TimeSpan timeout);
  public abstract IAsyncResult BeginUnlockMessage(AsyncCallback
callback, object state);
  public abstract IAsyncResult BeginUnlockMessage(TimeSpan timeout,
AsyncCallback callback, object state);
  public abstract void EndUnlockMessage(IAsyncResult result);
}
```

Thus, the temporary state can be the message "lock" that prevents other competing consumers from accessing the contents of the message. Accordingly, one consumer can request to receive a message. In response to the request, the extended communication medium behavior provides a view of the contents of the message to the consumer and locks the message from other competing consumers. The one consumer can then complete the receive process with success (i.e., signal delete) or complete the receive process with failure (i.e., signal unlock).

Figure 2:
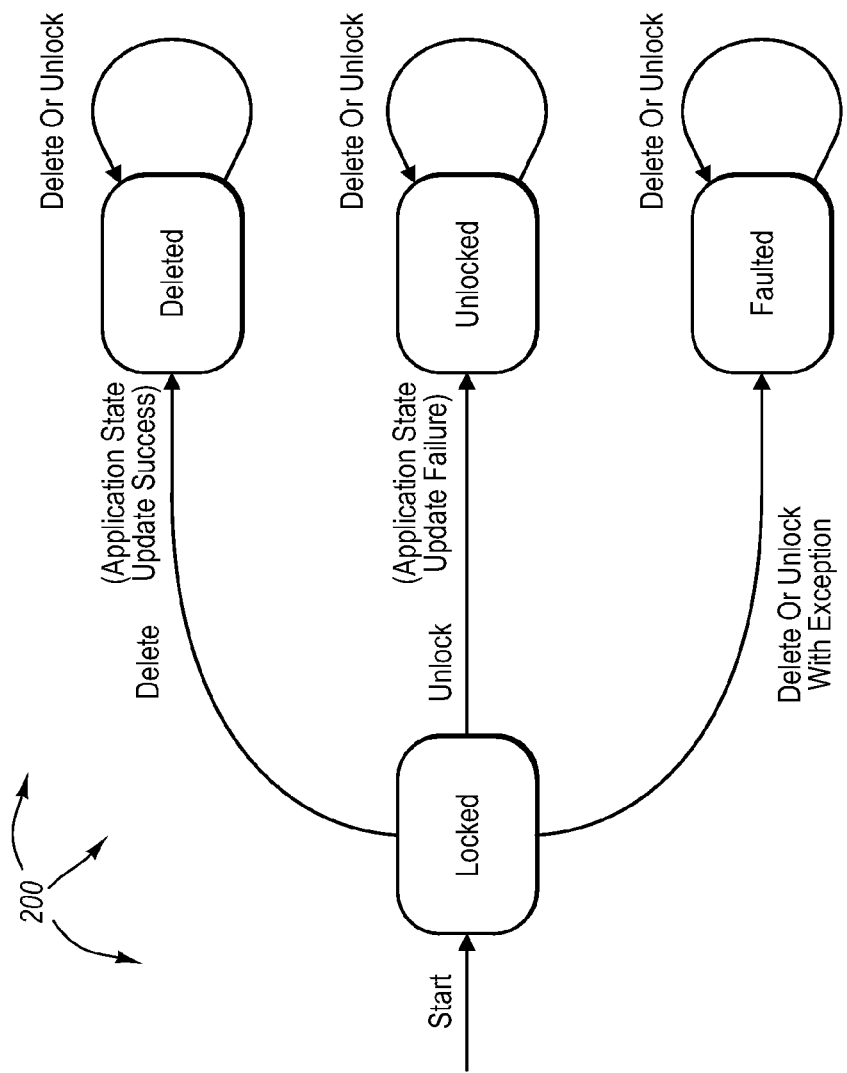
FIG. 2 illustrates an example state transition diagram for coordinating application state and communication medium state.

FIG. 2 illustrates an example state transition diagram 200 for coordinating application state and communication medium state. The state transition diagram is applicable to the receipt of a message. In some embodiments, a communication medium protects its resources from incorrectly behaving applications by associating some timeout with a lock. If the time out expires, the communication medium acts essentially equivalent to when the application signals unlock.

Embodiments of the invention, that is peeking into and locking a message, overload the receive function executed against the communication medium. The overloading permits the logic in the application to be polymorphic at this initial stage of this receive process. Embodiments utilize a further delete or unlock step to complete the message receipt. As such, applications can query communication medium to determine whether an overloaded receive function provides peek and/or lock functionality. A query can take the form of asking the communication medium for a PeekLockSettings object. The communication medium can respond indicating support for peeking into and/or locking messages.

The PeekLockSettings interface can be defined as follows:

```
public interfaceIPeekLockSettings
{
   TimeSpan DeleteTimeout {get;}
   TimeSpan UnlockTimeout {get;}
}
```

Figure 4:
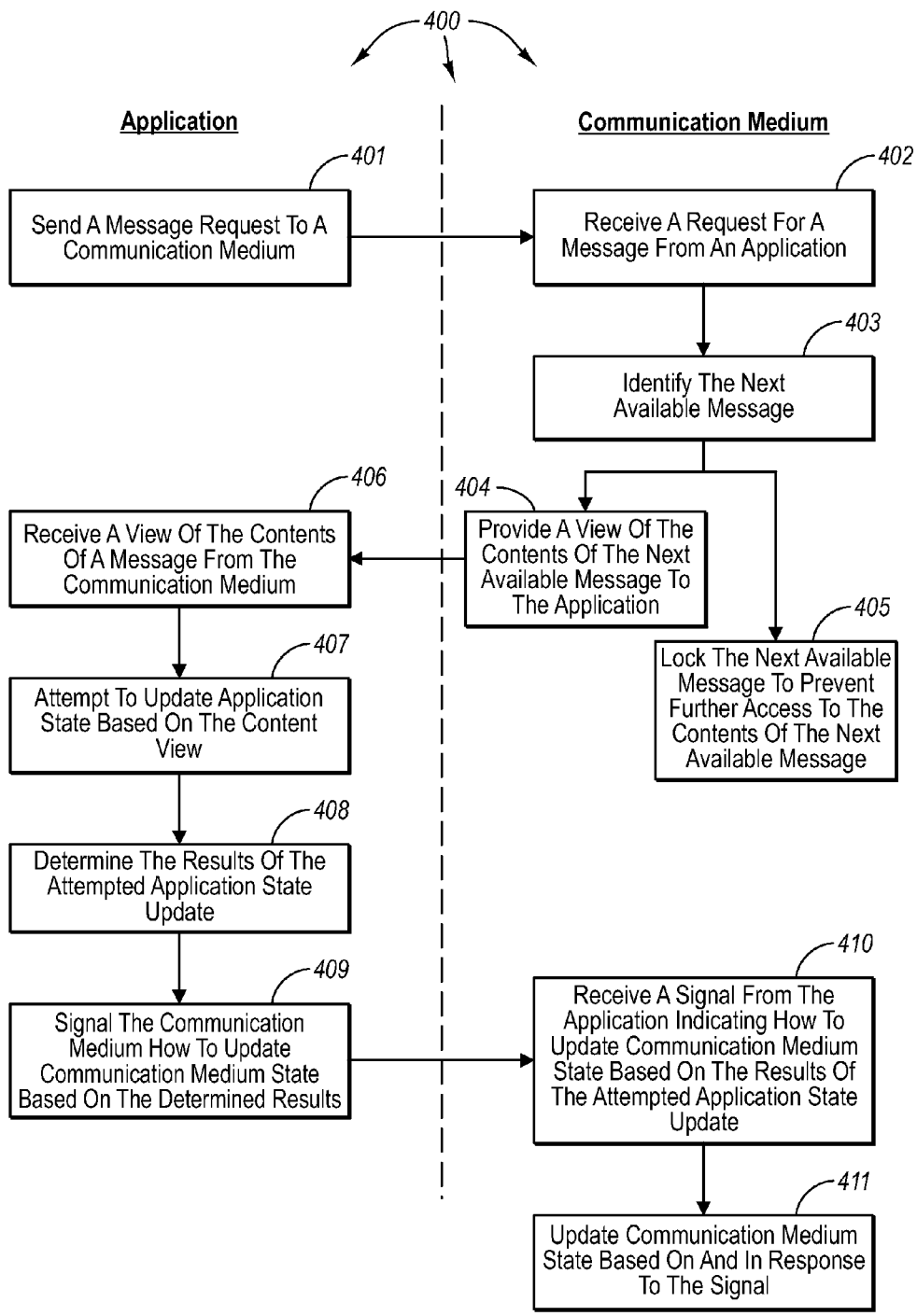
FIG. 4 illustrates a flow chart of an example method for coordinating application state and communication medium state.

FIG. 4 illustrates a flow chart of an example method 400 for coordinating application state and communication medium state. Method 400 will described with respect to the components and data in computer architecture 100.

Method 400 includes an act of sending a message request to a communication medium (act 401). For example, consumer 103A can send request 161 to communication medium 101. Request 161 can be a request for a message from communication medium 101. Method 400 includes an act of receiving a request for a message from an application (act 402). For example, communication medium 101 can receive request 161.

Method 400 includes an act of identifying the next available message (act 403). For example, communication medium can refer to next message pointer 121 to identify that message 112 is the next available message. When a message is locked, next message pointer 121 can be moved from the current message to the next message (communication medium 101 can be first in first out ("FIFO") in accordance with message flow 102). Thus, when message 113 is locked (i.e., another consumer is viewing the contents of message 113), next message pointer 121 can be adjusted to point to message 112.

Method 400 includes an act of providing a view of the contents of the next available message to the application (act 404). For example, communication medium 101 can provide content view 112A (e.g., a view of the message body of message 112) to consumer 103A. Method 400 includes an act of locking the message to prevent further access to the contents of the message (act 405). For example, communication medium 101 can lock message 112 to prevent further access by other consumers of application 103, such as, for example, consumer 103B. Locking message 112 can include changing the value of a local property (or other temporary message state) for message 112 to LOCKED.

Method 400 includes an act of receiving a view of the contents of a message from the communication medium (act 406). For example, consumer 103A can receive content view 112A from communication medium 101. Method 400 includes an act of attempting to update application state based on the content view (act 407). For example, application 103 can attempt to update state based on content view 112A, such as, for example, transitioning from state 104 to state 105 or state 106.

Method 400 includes an act of determining the results of the attempted application state update (act 408). For example, consumer 103A can determine if application state for application 103 was successfully or unsuccessfully updated based on content view 112A. A successfully update can result from application 103 processing content view 112A without error. On the other hand, an unsuccessful update can result when there is an error during application 103's processing of content view 112A.

Method 400 includes an act of signaling the communication medium how to update communication medium state based on the determined results (act 408). For example, consumer 103A can send signal 163 to communication medium 101. The signal can indicate that message 112 is to be deleted or unlocked. A signal to delete can be sent when application state of application 103 is successfully updated. On the other hand, a signal to unlock can be sent when there is an error updating application state of application 103.

Method 400 includes an act of receiving a signal from the application indicating how to update communication medium state based on the results of the attempted application state update (act 410). For example, communication medium can receive signal 163 from consumer 103A. Method 400 includes an act of updating communication medium state based on and in response to the signal (act 411). For example, communication medium 101 can update its state based on and in response to signal 163. Signal 163 can indicate an update to durable state or temporary state of communication medium 101.

For example, signal 163 can indicate that message 112 is to be deleted (an update to durable state) or unlocked (an update to temporary state) depending on the results of the attempted application state update. Thus, communication medium 101 can unlock (e.g., for failed application state update) message 112 based on and in response to signal 163. Alternately, communication medium 101 can delete (e.g., for successful application state update) message 112 based on and in response to signal 163.

The arrangement of acts in method 400 is merely one example embodiment of present invention. Embodiments that omit and/or combine acts of method 400 and/or that perform acts of method 400 in different orders are included within the scope of present invention.

Figure 3:
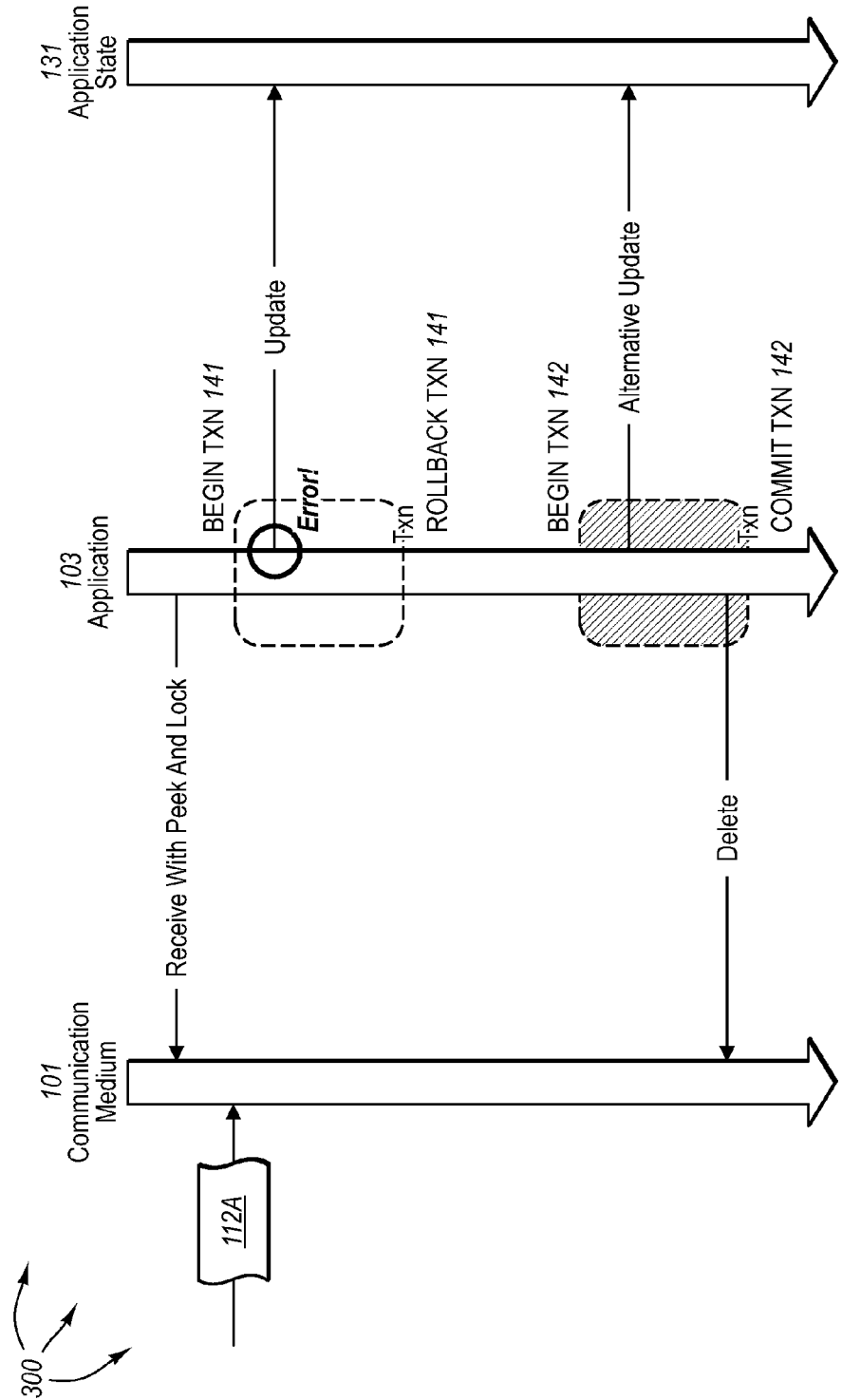
FIG. 3 illustrates an example sequence diagram of state coordination pattern semantics that includes transactions.

In some embodiments, state coordination can be further enhanced when an application uses a two-phase commit transaction around its internal state change and the delete operation. FIG. 3 illustrates an example sequence diagram 300 of state coordination pattern semantics that includes transactions. Sequence diagram 300 depicts an example application interaction with a communication medium when a two-phase commit transaction is being used. On receipt of content view 112A, the application 103 attempts an update to application state 131 (BEGIN TXN 141). In this example, the initial update fails and so the application 103 aborts the two-phase commit transaction it had performed that update under (ROLLBACK TXN 141).

As the initial receive of content view 112A from communication medium 101 was not performed under this transaction, the state of communication medium 101 remains unchanged by the abort of the transaction. That is, the creation and aborting of the transaction is at this stage just part of the internal logic of the application 103 and the communication medium 101 is not yet involved. Up to this point, communication medium 101 has simply provided a view on content view 112A and is keeping a lock on it. The state of the lock is unaltered by the abort of this transaction.

Application 103 now attempts an alternative update (BEGIN TXN 142) to its application state 131. This second update is successful and so it now proceeds to perform the delete operation against communication medium 101. This delete operation can be performed as previously described by calling the appropriate method on the PeekLockMessageProperty. The delete operation can be carried out under the same transaction that was just used to successfully update application state 131 (COMMIT TXN 142). In this transactional example, the delete can update the durable state of communication medium 101 to remove content view 112A and clean up any locks that are being held associated with message 112. If the transacted processing should now fail, the transaction aborts undoing any changes made to application state 131, communication medium 101, and content view 112A. However, when a transaction aborts, the lock on a message can remain. The receiving application can then use another transaction for a subsequent attempt to process the delete operation. Alternately, the receiving application can unlock message.

If application 103 transitions to a stage that it decides it cannot accept content view 112A, application 103 signals communication medium 101 by calling unlock. Unlock does not alter the durable state of a communication medium 101. Unlock cleans up (releases) the lock (i.e., temporary state) created for the message receive operation of message 112. Cleaning up the lock can include modifying the temporary state associated with message 112. For example, a message property can be changed from a value LOCKED to a value of UNLOCKED. Thus, in some embodiments, unlocking does not participate in any two-phase commit transaction.

Accordingly, embodiments of present invention provide a mechanism for a communication medium to provide a view of message content for a message (a peek) to an application along with the communication medium preventing further access to the message (a lock) until the application signals back how to handle the message. Thus, the communication medium indicates that the message is locked for the duration of processing at the application. Indicating that the message is locked significantly reduces the chance of the message being provided to another application (or another consumer of the same application) during the time the application is processing the view of message content.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. In a computer architecture including a communication medium and an application with a plurality of consumers that consume messages from the communication medium, a method for coordinating state between the communication medium and the application, the method comprising:

an act of a consumer sending a message request to the communication medium;

an act of the consumer receiving a view of the contents of a message from the communication medium, the receiving being a result of a receive function which is separated into an access action and a lock action, the communication medium having locked the message for exclusive access by the consumer in response to the message request and the communication medium having provided a view of the contents of the message to the consumer such that a competing consumer sees a message immediately following the locked message as a next available message;

an act of the consumer attempting to update application state for the application based on the content view;

an act of determining the results of the attempted application state update; and an act of signaling the communication medium how to update communication medium state based on the determined results to coordinate the communication medium state with the application state, the signal indicating the communication medium state is to unlock the message when the consumer cannot accept the message and the signal indicating the communication medium state is to delete the message when the consumer successfully accepts the message;

wherein the act of the consumer receiving a view of the contents of a message from the communication medium comprises an act of receiving a view of a message body that is contained in a message envelope along with a message header, wherein the contents of a message comprise an object, wherein the object is extended with property associated with the message, the property being an abstraction of a portion of temporary state the communication medium is holding and associating with the message, and wherein the consumer interacts with the property to complete message receipt.

2. The method as recited in claim 1, wherein the act of determining the results of the attempted application state update comprises an act of determining that the attempted application state update successfully transitioned the state of the application.

3. The method as recited in claim 2, wherein an act of determining that the attempted application state update successfully transitioned the state of the application comprises an act of determining that the attempted application state update successfully transitioned the application to a next state.

4. The method as recited in claim 2, wherein an act of determining that the attempted application state update successfully transitioned the state of the application comprises:
- an act of determining that the attempted application state update failed to transition the application to a next state;
- an act of attempting to transition the application to an alternate next state in response to the failure to transition the application to the next state; and
- an act of determining that the attempted application state update successfully transitioned the application to the alternate next state.

5. The method as recited in claim 2, wherein the act of signaling the communication medium how to update communication medium state comprises an act of signaling the communication medium to delete the message.

6. The method as recited in claim 1, wherein the act of determining the results of the attempted application state update comprises an act of determining that the attempted application state update failed to transition the state of the application.

7. The method as recited in claim 6, wherein the act of signaling the communication medium how to update communication medium state comprises an act of signaling the communication medium to unlock the message.

8. The method recited in claim 1, wherein the act of the consumer attempting to update application state for the application based on the content view, the act of determining the results of the attempted application state update, and the act signaling the communication medium how to update communication medium state based on the determined results to coordinate the communication medium state with the application state are all part of and included in the same transaction.

* * * * *